Dec. 22, 1942.        J. S. BALLARD        2,306,260
AUTOMATIC PROGRAM CONTROL MECHANISM
Filed Nov. 19, 1940          8 Sheets-Sheet 1

WITNESS:

INVENTOR
John Scott Ballard
BY
Augustus B Stoughton
ATTORNEY.

Dec. 22, 1942.  J. S. BALLARD  2,306,260
AUTOMATIC PROGRAM CONTROL MECHANISM
Filed Nov. 19, 1940  8 Sheets-Sheet 2

WITNESS:

INVENTOR
John Scott Ballard
BY Augustus B Stoughton
ATTORNEY.

Dec. 22, 1942.     J. S. BALLARD     2,306,260
AUTOMATIC PROGRAM CONTROL MECHANISM
Filed Nov. 19, 1940     8 Sheets-Sheet 3

INVENTOR
John Scott Ballard
BY
Augustus B Stoughton
ATTORNEY.

WITNESS:

Dec. 22, 1942.  J. S. BALLARD  2,306,260
AUTOMATIC PROGRAM CONTROL MECHANISM
Filed Nov. 19, 1940  8 Sheets-Sheet 4
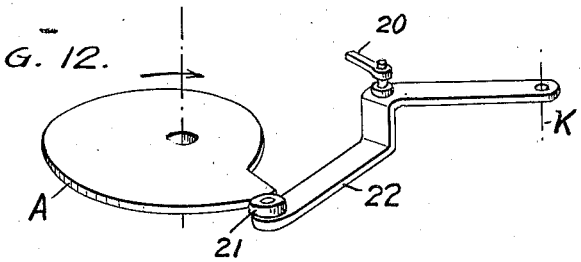
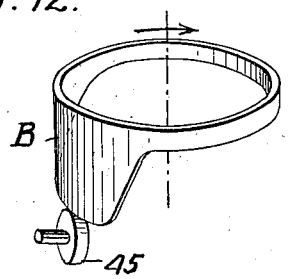
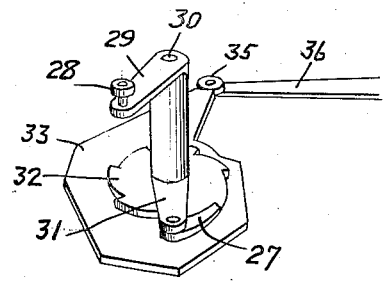
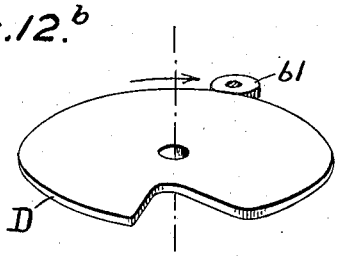
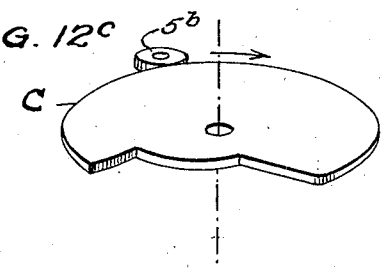
WITNESS:
INVENTOR
John Scott Ballard
BY
Augustus B. Stoughton
ATTORNEY.

Dec. 22, 1942.         J. S. BALLARD         2,306,260
AUTOMATIC PROGRAM CONTROL MECHANISM
Filed Nov. 19, 1940          8 Sheets-Sheet 5

WITNESS:
Rob't P. Mitchel.

INVENTOR
John Scott Ballard
BY
Augustus B Stoughton
ATTORNEY.

Dec. 22, 1942.    J. S. BALLARD    2,306,260
AUTOMATIC PROGRAM CONTROL MECHANISM
Filed Nov. 19, 1940    8 Sheets-Sheet 7
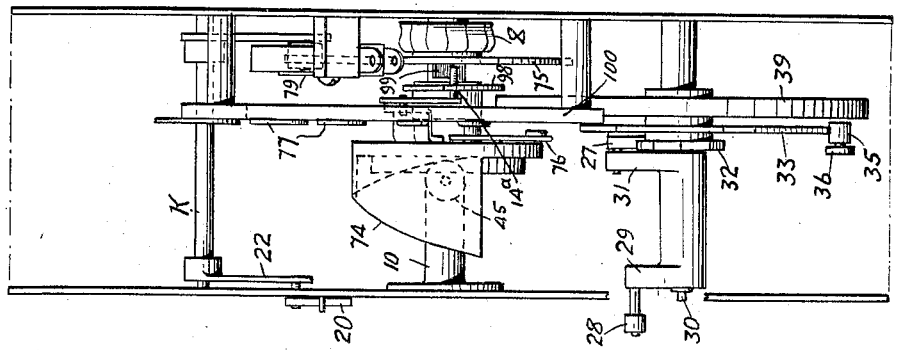
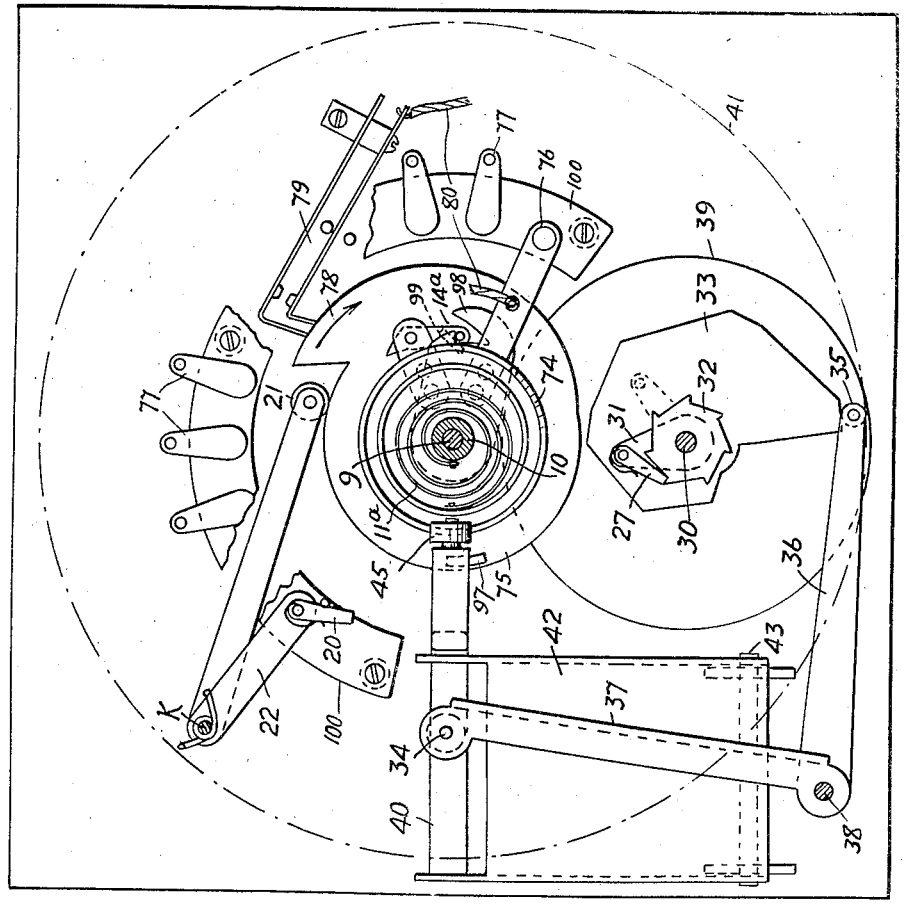
WITNESS:
INVENTOR
John Scott Ballard
BY
Augustus B. Stoughton
ATTORNEY.

Dec. 22, 1942.  J. S. BALLARD  2,306,260
AUTOMATIC PROGRAM CONTROL MECHANISM
Filed Nov. 19, 1940  8 Sheets-Sheet 8

WITNESS:
Robt R Kitchel.

INVENTOR
John Scott Ballard
BY
Augustus B. Stoughton
ATTORNEY

Patented Dec. 22, 1942

2,306,260

UNITED STATES PATENT OFFICE 2,306,260

AUTOMATIC PROGRAM CONTROL MECHANISM

John Scott Ballard, Bloomfield, N. J., assignor of forty per cent to C. J. Stover, Donald Tulloch, Jr., and Carrell J. Stover, Philadelphia, Pa., a partnership trading as C. J. Stover, Philadelphia, Pa.

Application November 19, 1940, Serial No. 366,233

17 Claims. (Cl. 250—40)

The principal object of the present invention is to provide simple, reliable and efficient means for governing a radio receiver set in such a way that one may make a selection in advance from a program covering a week's production and in such a way that there will be produced automatically the selected items in weekly repetition until the mechanism is reset; another object is to provide for positioning an infinitely variable control device, whether associated with a radio receiver set or not and such as a condenser, a rheostat, a coil, a transformer or the like, in accordance with a predetermined cyclic program; another object of the invention is to automatically turn a radio receiver on or off, to change stations or maintain the radio receiver in a given state; any of these at for example intervals of fifteen minutes and repeating such operation exactly one week, or other interval of time, later, unless a manual change is made; another object is to preselect a complete sequence of radio programs for a whole week and to automatically tune the radio receiver to them at the same time every week; another object is to provide a purely mechanical device for this purpose; and another object is to provide a selector or control device on which a desired sequence of selections may be pre-set and which will in sequence perform each selecting operation as may be required by the passage of a period of time or by some event other than the passage of a period of time.

Other objects of the invention will appear from the following description at the end of which the invention will be claimed.

Generally stated the invention comprises a controller, a plurality of positioning elements or pins, having differing dimensional characteristics, a carrier adapted to receive said elements in time relation, mechanism cooperating successively with each of said elements at times determined by their position in the carrier and operating to select such position of the controller as is determined by different dimensional characteristics of the elements, and a constant speed motor for actuating the parts.

The invention further comprises a constant speed motor driven element which makes one complete revolution in any suitable period of time, for example one complete revolution in fifteen minutes, a pin carrying disk turned a predetermined part of a revolution at equal intervals, two sets of pins of which the pins of one set are individually settable in the disk for selection of station and time and those of the other set are adjustable for initially setting the device so that a particular pin or group of pins of the first, set will correspond to a particular radio station or to a particular position of a controller mechanism, a master pin and bar to cooperate with the pins carried by the disk and the adjustable pins, the master pin being laterally positioned for each day of the week, and spring operated mechanism set and released by the motor and controlled by said pins and adapted to actuate the devices which govern the radio receiver in accordance with the setting and character of the pins of the sets.

The invention also comprises the improvements to be presently described and finally claimed.

The invention will be described in connection with the accompanying drawings forming part hereof and illustrating one embodiment of the invention and in which:

Figures 12, 12a, 12b, 12c, 13, 14 and 15 are diagrammatic or schematic views illustrating the operation of various cams.

Figures 19, 20 and 21 are views illustrating another modification.

Figure 1:
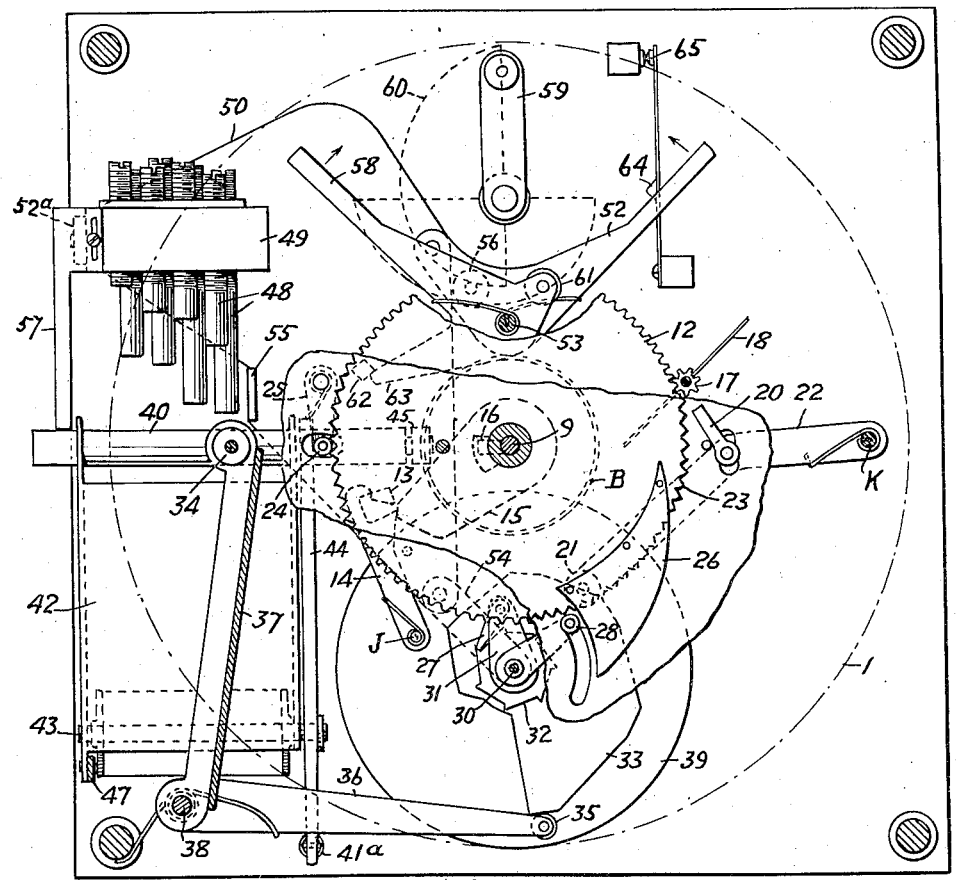
Figure 1 is a top or plan view with various parts omitted for the sake of clearness.

Referring to the drawings, Figs. 1 to 15, the disk 1 is provided with radially disposed rows of holes and each row is spaced to correspond with a time interval of 15 minutes in a day of 24 hours. These holes are so disposed that there is an annular row of holes for every day in the week. The result is that there is a hole for every fifteen minute period in a week. Referring to Figure 4 counting from the periphery in a radial line toward the center there are seven holes and they correspond to the seven days of a week. Assuming that the first ring of holes inward from the periphery corresponds to Sunday, and going clockwise around the ring of holes each one of those holes represents a fifteen minute interval so that there are in that ring 96 holes which indicate fifteen minute intervals for Sunday, and likewise proceeding toward the center of the disk for the following days of the week. There is therefore a total of 672 holes which completely cover every 15 minute interval in a week. Into any one of these holes may be placed any one of a number of pins 2 of different lengths, Fig. 11 and the heads of the pins may well be of distinguishing color corresponding to the stations to be tuned in. The absence of a pin operates to maintain the radio receiver in its then state or position. The pins are graduated in groups, the pins in each group having shanks of equal length. One particular pin 3 shown as longer than the rest corresponds to the operation of turning the set off. A pin of any other group corresponds to turning the set on and tuning it to a particular station. The absence of a pin in a hole indicates that no change in the state of the set is to be effected at the time represented. Therefore only one pin in a single hole is required to tune to a desired station and maintain that tuning for an interval greater than fifteen minutes, since the station selected at the beginning of the interval is determined by the character of the pin in the hole representing the beginning of the interval and that setting of the radio receiver is maintained thereafter for any desired length of time by the omission of pins from any desired number of succeeding holes in the disk. The advantage hereby gained is that a great deal of unnecessary duplication of selection is eliminated with the consequent elimination of the necessity of keeping a large number of extra pins on hand. This advantage would be most apparent in regions where only two or three radio stations may be received and therefore changes in station would probably be less frequent than in a large city.

The center of the disk may be provided with a cavity 4 intended to hold extra pins.

The cover 41 of the device may be made of glass or other transparent material. In such event the heads of pins 2 are always visible as is the ring 5. If the head of each pin 2 is colored or otherwise marked to indicate the broadcast station which that pin represents, the complete program arranged for the entire week may be readily observed. Furthermore, cover 41 may be manually raised to provide ready access to the pins. Manually operated pin ejector 47 facilitates removal of pins whenever a change in program is desired.

On the disk I is a ring 5 indicating the fifteen minute periods of the days, and the ring 5 may be advanced or retarded one hour to compensate for daylight saving time. Dial 6 indicates the passage of the fifteen minute period and is used to adjust the timing cycle of the mechanism into synchronism with the radio programs.

Synchronous or constant speed motor 7 not only controls the timing of the mechanism but also supplies all power necessary for its operation. It is an advantage that only one motor is required to time the selector, perform the selecting operation, and actuate the radio receiver tuning device. Driven by synchronous motor 7 through a friction clutch 8 is a shaft 9 which carries the indicating dial 6 and makes one complete revolution every fifteen minutes. Concentric with the shaft 9 is a tube or more accurately a cam carrying tube 10 which tends to turn with it through the intervention of a clockspring or spiral spring 11 attached to both shaft 9 and tube 10 and having sufficient energy continually supplied from the driven shaft 9 to perform the necessary operations which are hereinafter described.

Figure 9:
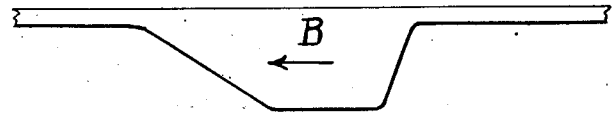

The tube 10 turns under the action of the spring 11 with an intermittent movement once at each fifteen minute interval, the spring being wound from the shaft 9 and the tube being detained for substantially 15 minutes and then released for one comparatively quick revolution by a latch which will be described and which is operated from the constantly driven shaft 9. The mechanism last described constitutes an impulse coupling. Mounted on the tube 10 are, at its top a gear 12 and from its top downward a disk cam A and a crown cam B and toward the bottom disk cams D and C. These cams are shown in Figs. 6 to 9 inclusive and 12, 12a, 12b, 12c, 14 and 15. Figure 9 shows a development of cam B. Mounted on the top of the gear 12 is an upward projection 13, Figures 1 and 2. 14 is a spring pressed latch pivoted at J to some fixed part of the housing of the mechanism and by engagement and disengagement with the projection 13 it serves to lock the tube 10 and parts attached thereto against the torque of the spring 11. The arm 15 which is driven by and attached to the upper end portion of the shaft 9 by means of a pin 16 projecting from the shaft 9 into a notch in the arm 15 serves to release the latch 14 at 15 minute intervals. In making a complete revolution the arm 15 releases the latch 14 from the projection 13, freeing the tube 10 for relatively quick rotation and then the latch 14 reengages the projection 13 as shown in Figure 1. The complete revolution of the tube 10 takes place in a short interval at the end of a fifteen minute period. In order to control the speed of revolution of the tube 10 gear wheel 12 meshes with pinion 17 mounted on a shaft carrying an air governor 18 through shock absorbing spring 19.

The cams A, B, C and D effectuate through instrumentalities that will be described, the tuning in of the radio receiver in correspondence with the stations called for by the pins 2. Great accuracy of timing is obtained since the release of the cam carrying tube 10 is effected through the co-operation of the same group of releasing elements for each timing cycle and depends upon a complete revolution of the timing shaft 9.

Figure 10:
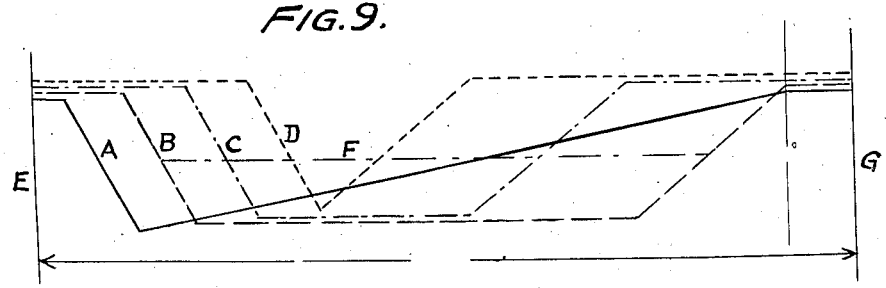
Figure 11:
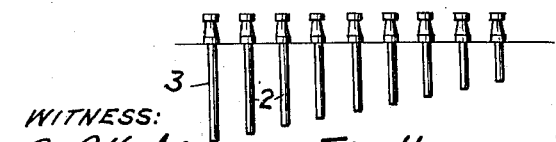
Figures 11 is a detailed view illustrating pins that are employed in connection with the disk shown in Figure 4.

The operations and settings of the cams A, B, C and D are graphically represented in Figure 10, for a complete revolution of the tube 10 to which they are attached and which carries them. Line E represents the starting of a revolution of the tube 10 when it is released by the latch 14 and line G represents the end of the revolution when the tube 10 is again caught by the latch 14. The horizontal lines indicate periods of inaction of the cams in respect to their followers. During these periods the spring pressed followers may be held clear of the cam faces under the restraint of provisions which will be hereinafter described as illustrated by the line F, Figure 10. Proceeding from left to right in Fig. 10 the descending lines represent periods of activity and the ascending lines represent periods during which the rollers or cam followers are acted on by the cam edges and are returned to their original positions.

Cam A serves to turn disk 1 through one fifteen minute period or 1/96 revolution for each revolution of the cam A through the intervention of oscillating pawl 20. For this purpose a roller 21 mounted on arm 22 pivoted at K is employed. The roller 21 is shown in Figure 1, but the cam A is omitted from that figure. Figure 12 is a diagram illustrating the foregoing description. The pawl 20 pivoted on the arm 22 acts upon the teeth of a ratchet wheel 23 concentrically mounted on disk 1 and turns the disk 1/96 of a revolution at each stroke.

A roller 24 on arm 25 pivotally mounted on the frame bears slightly against the teeth of ratchet wheel 23, and restrains disk 1 against unintentional rotation.

Figure 2:
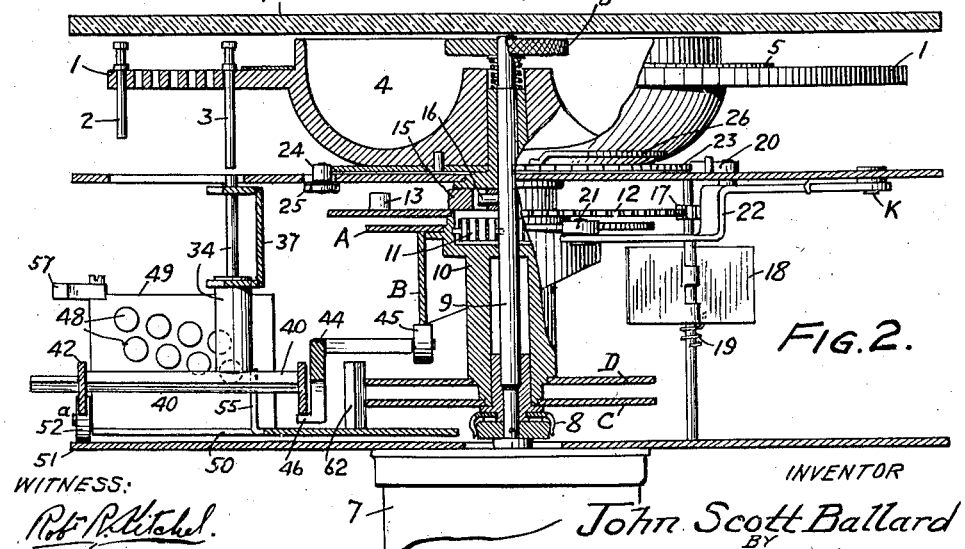
Figure 2 is an elevational view partly in section and partly in elevation of the device shown in Figure 1.

Rigidly mounted on the ratchet wheel 23 and toward the top in Figure 2 is a spiral cam 26. Cam 26 oscillates pawl 27, Fig. 13, by means of a roller 28 on an arm assembly 29 pivoted on the shaft 30. Pawl 27 pivoted on arm 31 acts upon the teeth of a ratchet wheel 32 having seven teeth and mounted on stepped spiral cam 33 fixed on shaft 30. Cam 33 has seven faces corresponding to the seven days in the week, and it serves to position a pin 34 in successive radially inward steps under each hole in a radial row of holes in disk 1. The pin 34 is positioned one step inwards for each revolution of the disk 1 and returned to the outermost hole after seven revolutions of the disk 1. Cam 33 acts against roller 35 mounted on a spring pressed arm 36 which is rigidly fixed in a frame 37 carrying pin 34 and the frame is pivoted on shaft 38, which shaft 39 is fixed in respect to the frame of the mechanism. The frame 37 is provided at its extremity with two holes through which pin 34 is mounted to move vertically. To locate the pin 34 under the correct pin 2 and to indicate such location a hand wheel 39 is mounted on the shaft 30 and shows the names of the days of the week on its edge which may appear through a suitable slot in the cabinet. At this point it may be explained that the pin 34 may be regarded as a master pin in that by contacting with one or another of the pins 2 it operates to limit the rising motion of the bar 40. The vertical section of the bar 40 acting in cooperation with mechanism which will be described controls and limits the operation of the mechanism which moves the controller of the radio set. The pin 34 and the pins 2 cooperate as follows: The upward motion of the pin 34 lifts a pin 2 until the head of the pin 2 contacts with the cover 41 of the device. The length of the pin 2 controls the lift of the pin 34 as the crown cam B (mounted on tube 10, which revolves once with a quick motion every fifteen minutes) allows bar 40 to rise under the influence of spring 41a (Figs. 3 and 15) toward the right, and in rising bar 40 lifts pin 34 until its rise is stopped by a pin 2 when the latter contacts with cover 41. The bar 40 is rigidly mounted between the free ends of arms of frame 42, Fig. 15. The frame is pivoted at one end on a shaft 43, Fig. 1, turnably held in a bracket located toward the left hand of the device, Fig. 1, with the free end of the frame carrying the bar 40 projecting inward. The cam follower 44 (Figs. 2 and 15) is pivoted on shaft 43 and is spring pressed toward the edge of the cam B and is provided at its free end with an arm carrying the cam follower roller 45 and with a foot 46 that underlies the free end of the frame 42. It may be here stated that if the rise of the bar 40 is checked the roller 45 leaves the edge of cam B and the bar 40 remains where checked.

Cam C mounted on tube 10 revolves at the same time that cam B is revolved. There is a set of adjustable pins 48 and they are shown as screwed into a metal block 49 and fiber locking pad, and they are arranged with their axes parallel and stepped upward in steps equal to the steps of the pins 2. Pins 48 are graduated in length and each is adjustable over a small range to permit tuning in of one of the radio stations which it may be used to represent. The adjustability of the pins 48 ensures accuracy of tuning and the screw adjustment of the pins is substantially micrometric. Block 49 is mounted on plate 50 which plate is horizontally disposed and is moved backward and forward substantially parallel to plate 51. For this purpose roller 52a is provided on block 49.

Figure 14:
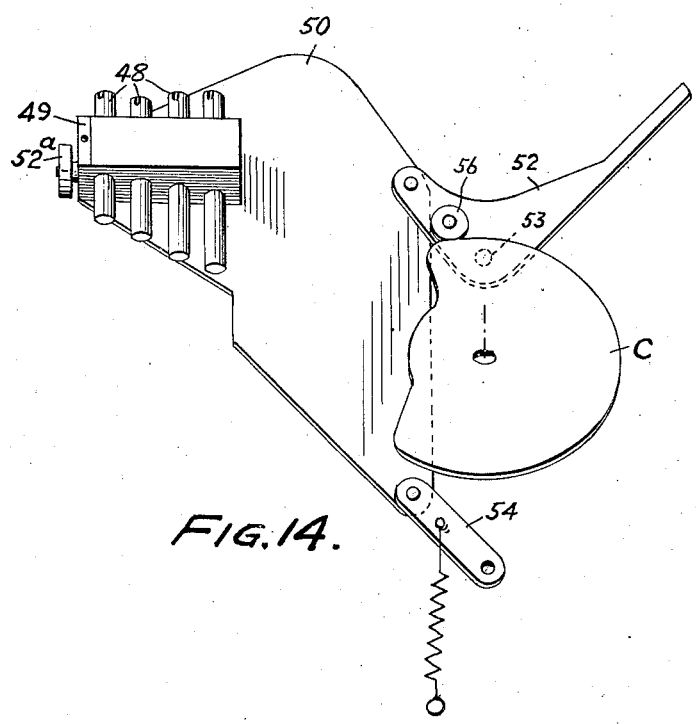
Figure 15:
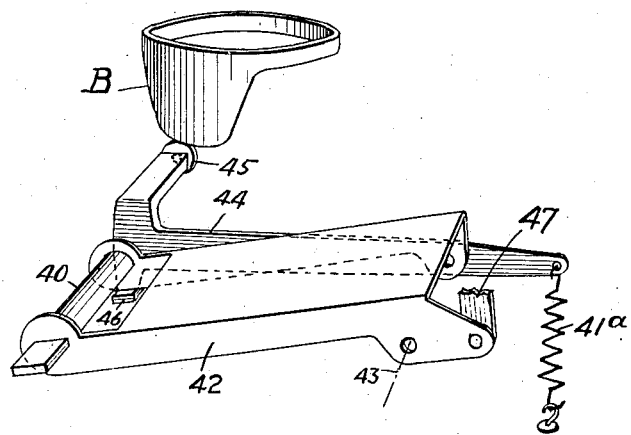

Referring to Figures 1 and 14 plate 50 is pivoted to one end of arm 52 which is pivoted at 53 to a pivot fixed in respect to the housing or frame of the machine, and by link 54 pivoted at the bottom of shaft 30. In this way the plate 50 moves substantially parallel to an imaginary line drawn between points 53 and 30, and up and down in Figs. 1 and 14 in such a way that the axes of pins 48 remain substantially perpendicular to the axis of bar 40, regardless of the position of plate 50. Cam C operates on a roller 56, Fig. 12c carried by arm 52, Fig. 1, and it serves to move the plate 50 up and down in Figure 1 for a distance that is determined by the pin of the set 48 which collides with the bar 40 when bar 40 is in a position determined by one of the pins of the set 2. The arm 52 turns about the fixed point 53 counterclockwise and its position is fixed by the position of the plate 50. In addition to pins 48, the plate 50 is provided with a projection 55 which, when the bar 40 is held in low position, as by a long pin 3, permits the set to be turned off as will be described. The block 49 is also provided with a rod 57 disposed at a higher level than the projection 55 and which, when the bar is permitted to rise to its top position, as by the absence of a pin 2 in disk 1, prevents the condition of the set from being changed.

It may be remarked that the arm 57 is shown in Fig. 1 as adjustably mounted on the block 49, so that the effective length may be increased or diminished. The arm 57 may be made equal to the effective length of the projection 55, in that case arm 57 acts in the same way as projection 55 except that the absence of a pin turns off the set.

Cam D mounted on and revolving with tube 10 controls the position of arm 58 which is also pivoted at 53 and which is provided with a cam follower. Arm 58 cooperates with arm 52 in scissor like fashion to position the controller 59 of the radio set. As shown the arms 58 and 52 operate on a roller on arm 59 and this roller is held between arms 52 and 58 tuning the condenser 60, to which arm 59 is attached, to a particular station as determined by the preadjustment of a pin 48. The rollers 56 and 61 which actuate the arms 58 and 52 are spring pressed to the faces of the cams C and D and they are sometimes held against the force of their spring by reason of the fact that the movement of the plate 50 is arrested and by further reason of the fact that the movement of the arm 58 is arrested by the roller on arm 59 when the latter is in contact with the arm 52. The spring which presses the arm 52 to its cam C is stronger than the spring which presses arm 58 to its cam D and the spring of the arm 52 tends to shift plate 50 downwards in Fig. 1 and to turn the arm 52 counterclockwise. The release of arm 58 is dependent upon plate 50 moving a pin 62 carried on the plate. This pin 62 works on the heel 63 which is integral with the arm 58. From the foregoing description it is evident that the position of the plate 50 controls the radial position of the arm 52 and the radial position of the arm 52 controls the position of the arm 59 which in turn controls the tuning of the set. The arm 58 cooperates with the arm 52 in positioning the arm 59 in respect to the arm 52.

If no pin 2 is encountered by master pin 34 and the stop bar 57 projecting from the block 49 rests on the extension of bar 40 the pin 62 will not effect the release of the arm 58 for the reason that the plate 50 does not travel far enough to do so and therefore the set remains as is. If an "off" pin 3 is encountered projection 55 in coming to rest on bar 40 will enable arms 58 and 52 to turn arm 59 and bear against insulator 64 opening the switch 65 which carries power to the radio.

Synchronous motor 7 has a separate power line provided with a manually operated switch not shown to facilitate adjustment of the mechanism which times the cycle.

The mode of operation may be described as follows: Near the end of a fifteen minute interval, pin 16 projecting from shaft 9, moves arm 15 causing the release of latch 14 which permits tube 10 and parts attached thereto to rotate under the force of spring 11. Cam A through mechanism previously described turns disk 1 one step and cam B allows bar 40, carrying pin 34 and pressed upward by spring 41ª, to rise until pin 34 contacts a pin 2 whose upward motion is stopped by cover 41. Thus bar 40 is positioned vertically.

It may be remarked that extreme accuracy in the length of the pins 2 is not necessary because the stop pins 48 are so disposed in block 49 that the proper pin 48 will contact the bar 40 even though the vertical position of bar 40 may vary slightly from its intended position.

Block 49 carrying pins 48 is released by cam C and slides under the force of its spring Fig. 14, until one of the pins 48 collides with the bar 40 stopping arm 52 in a given desired position.

Arm 58 pressed by its spring, and released by cam D moves arm 59 against arm 52.

In this way arm 59 is positioned as desired.

Pin 34 is traversed on bar 40 by cam 33 one step radially inward at the end of each 24 hour interval in order to bring it in line with the annular row of pins 2 representing the proper day in the week.

Figure 3:
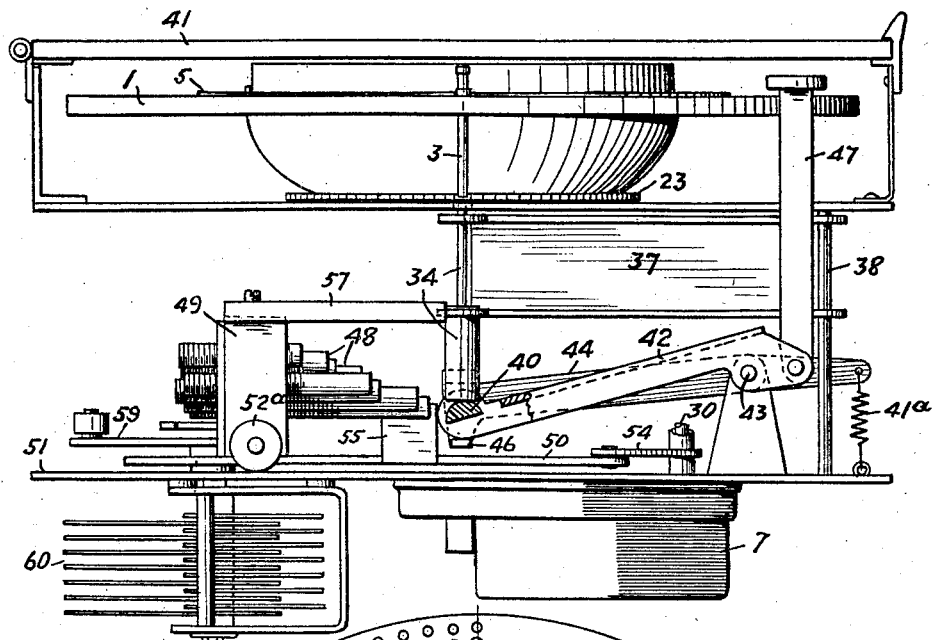
Figure 3 is a similar view looking from left to right in Figure 1.
Figure 4:
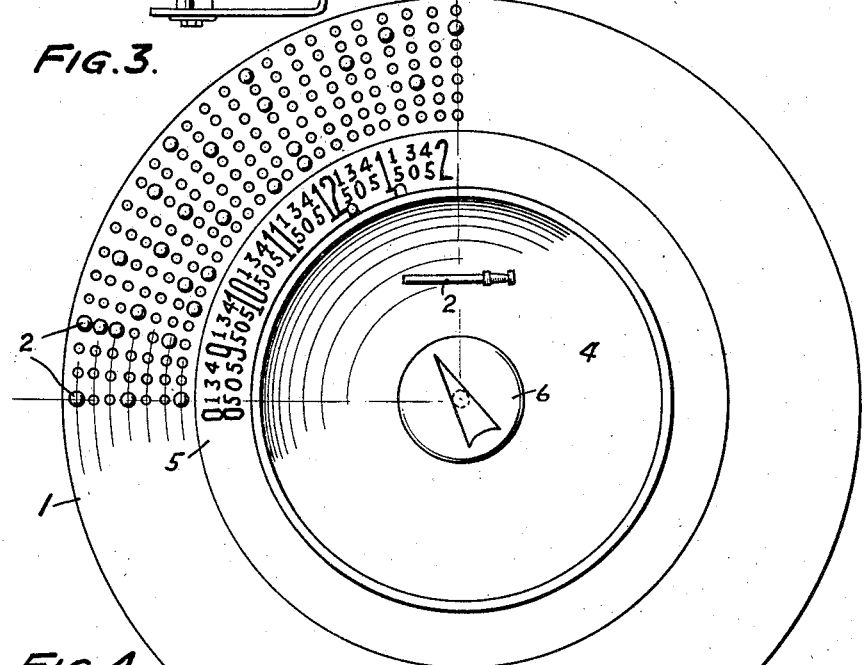
Figure 4 is a top or plan view of the disk which controls the mechanism that governs the radio receiver.
Figure 5:
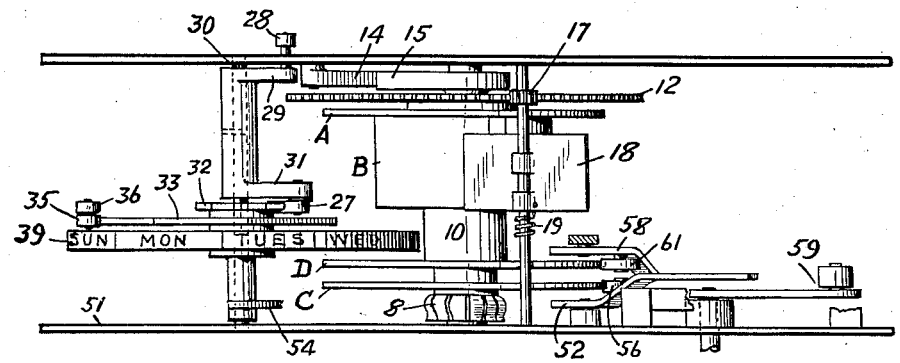
Figure 5 is an elevational view looking from right to left in Figure 1.
Figure 6:
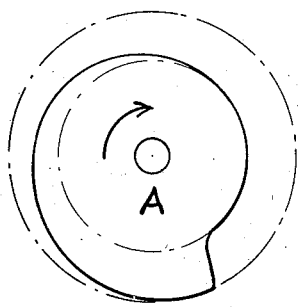
Figures 6, 7, 8, 9 and 10 are views illustrating cams which are employed for actuating certain of the parts of the mechanism which are held up to them by springs and in some of which, when the movement of the parts is arrested, the cam followers ride clear of the cam faces.
Figure 7:
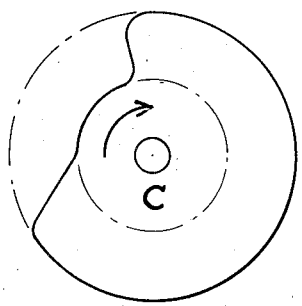
Figure 8:
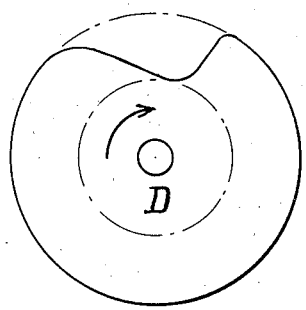
Figures 16, 18:
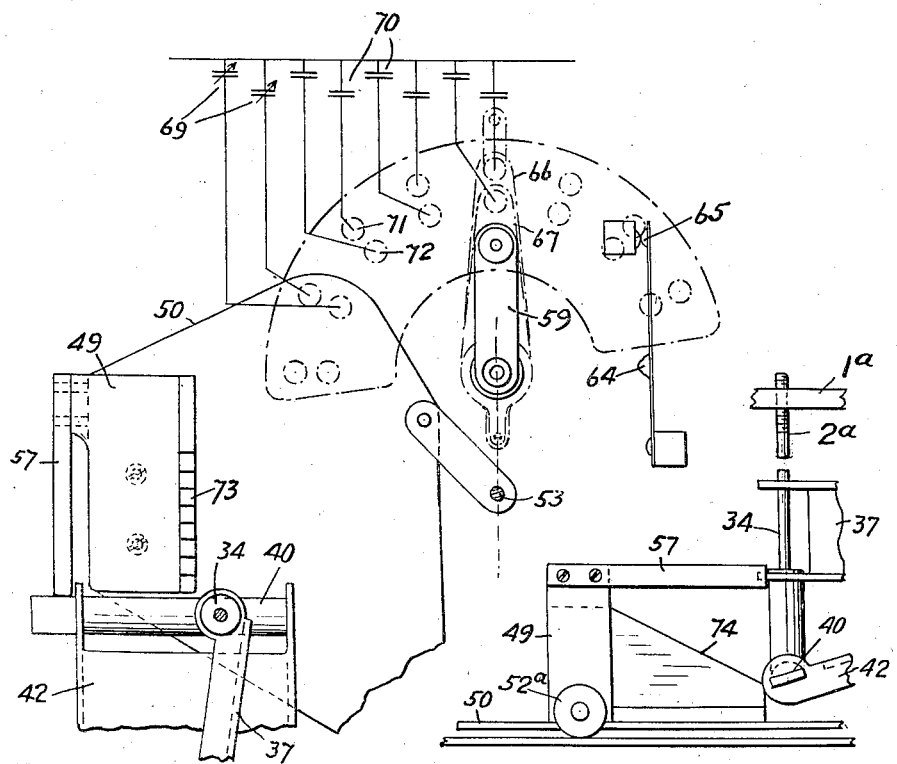
Figure 16 is a detail view illustrating a modification.
Figure 18 is a detail view illustrating another modification.
Figure 17:
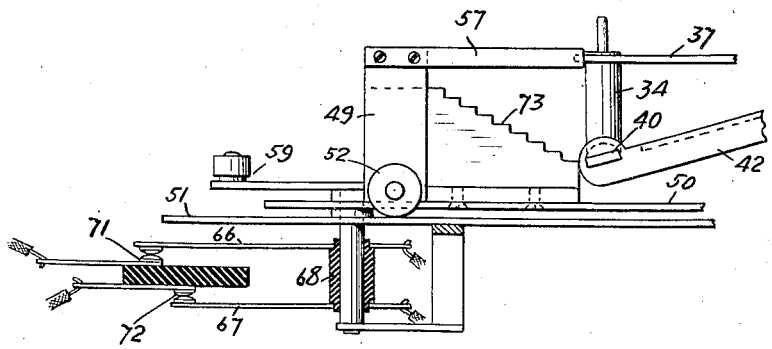
Figure 17 is a side view of some of the parts shown in Figure 16.

The construction and mode of operation of the modification shown in Figs. 16 and 17 are as above described, except as follows. In this case use is made of a radio set which is tuned to different stations by switching from one set of preadjusted condensers to another and it is operated automatically by the described mechanism as follows:

Condenser 60 of Fig. 3 is replaced by single pole multiple throw switches having arms 66 and 67 mounted on a common shaft with, and acting with arm 59, but insulated from it by sleeve 68. Set of condensers 69 are easily controlled variable condensers covering the frequency range of the radio set. Sets of condensers 70 represent preadjustable condensers tuned to particular stations. Switching from one set of condensers to another is effected through contact arms 66 and 67 turning to rest upon a pair of respective contacts at 71 and 72 under influences heretofore described; such positions being accurately determined by a step-cut plate 73 mounted on block 49. Contacts 71 and 72 are placed at points of stopping of arm 59 determined by the steps of plate 73. The contacts are spaced in consonance with the spacing of the steps of plate 73.

Referring to Fig. 18, block 49 is shown as provided with an inclined face 74 which in respect to the bar 40 operates in substantially the same way as the pins 48 or as the steps 73 on the block 49.

In this modification the pins 2ª have threaded shanks and are screwed into tapped holes in plate 1ª. Arm 59 may be made to stop in an infinite number of positions as determined by adjustment of the pins 2ª in plate 1ª in respect to the extent to which they project from it.

To any of the controls used with the mechanism appropriate manual controls may be attached which can be operated at any time except during the moment when the automatic control operates. This applies to the selective switch of the step-cut modification as well as to the other embodiments of the invention. Condensers 69 may be set hours ahead, if required, to tune in an infrequently used station not pre-tuned by any of the fixed condensers.

It will be noted that in Figs. 2, 3 and 18 pins 2 and 2ª are shown as projecting from disk 1. It should be noted that for operation of the device it is not necessary that the pins 2 project from the under side of disk 1 in Figs. 2 and 3, nor in Fig. 18 is it necessary that the pins 2ª project from either side of disk 1ª. In the device shown in Figs. 2 and 3 the determining factor is the length of pin interposed between cover 41 and master-pin 34, while in the modification shown in Fig. 18 the determining factor is the vertical position of the lower extremity of pin 2ª relative to the plane of the disk, and this holds true even though the ends of the pins 2 or 2ª do not project beyond the bottom of the disk.

It may be remarked that the element 59 is a controller and that the described mechanism positions or sets it to predetermined positions at predetermined times and this the mechanism does whether the element 59 be associated with a radio receiver or with another device.

In the modification shown in Figs. 19 to 22, inclusive synchronous motor 7 continually drives shaft 9 and disc cam 75 attached thereto in a clockwise direction in Fig. 19 making one revolution every fifteen minutes. The crown cam 74 is mounted rotably on fixed tube 10 and is connected thereto by clockspring 11ª which tends to turn cam 74 and its connected parts counterclockwise in Fig. 19. Attached to a projecting arm of cam 74 is a two-position latch 14ª, having a pin projecting downward in Fig. 21 and adapted in its outermost position to engage block 97 mounted on the upper surface of cam 75. This engagement serves to turn cam 74 clockwise in Fig. 19 until latch 14ª is pushed off block 97 and caught by catch 98 which is rigidly mounted on fixed tube 10. Cam 74 serves to raise and lower bar 40 by means of roller 45 riding on the cam surface and positions its projecting contact arm 76 on one of the contacts 77 as is determined by the amount it can turn until stopped by contact of master pin 34 with the end of one of pins 2 as that pin strikes the cover 41. With latch 14ª caught in catch 98 bar 40 is in its lowest position and contact arm 76 is in cocked position. The rotation of cam 75 for the next half cycle serves to oscillate pawl 20 to advance disc 1 one division locating a new pin 2 above the master pin 34. A release block 99 mounted on cam 75 then pushes latch 14ª off catch 98 and cam 74 is released to rotate counterclockwise under the influence of spring 11ª until contact arm 76 alights on one of contacts 77 as determined by the new pin 2. Shortly thereafter, contact arm 79 drops off the step of cam 75 upon which it rides and contacts arm 78 connected by flexible wire 80 to contact arm 76, thereby closing a circuit between contact 79, and one of contacts 77 until contact arm 78 also drops off the step of cam 75 and breaks the circuit. Eventually block 97 again picks up latch 14ª and the cycle is repeated. If no pin 2 is encountered by master pin 34, contact arm 76 turns past all the station selecting contacts, and comes to rest upon an insulated portion of the arc 100 which holds contacts 77 resulting in no change of program. If desired, the particular contact 77 which is adapted to turn the set off may be placed at this point instead of at the stopping point determined by the "off" pin 2. In that case a station pin 2 is required for every 15 minute period during which the radio is desired to operate but to certain persons such provision may be preferable.

Figure 21:
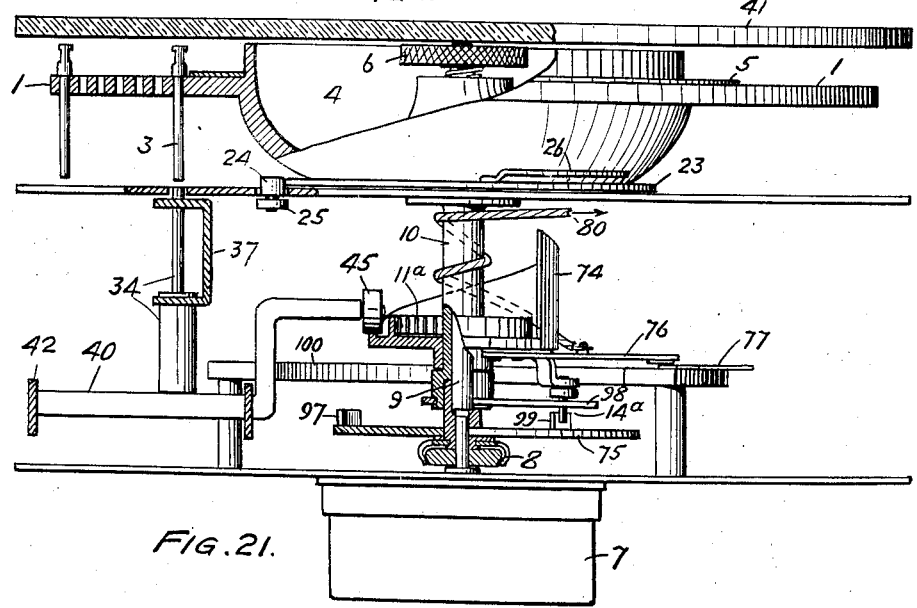

One difference in the construction and mode of operation of the apparatus shown in Figs. 1 to 4 and the modification shown in Figs. 19 to 21 is that, in the former, the cam B makes a complete revolution and the roller 45 is positioned by the pins 2 in such a way that its position controls the selection mechanism; whereas, in Figs. 19 to 21, the position of the roller 45, as established by the pins 2, stops the rotation of the cam 74 which carries the controller 76 in position for the proper selection.

Obviously in this modification there is merely a change in the mechanism through which the vertical position of the bar 40 determines the position of the controller.

Figure 22:
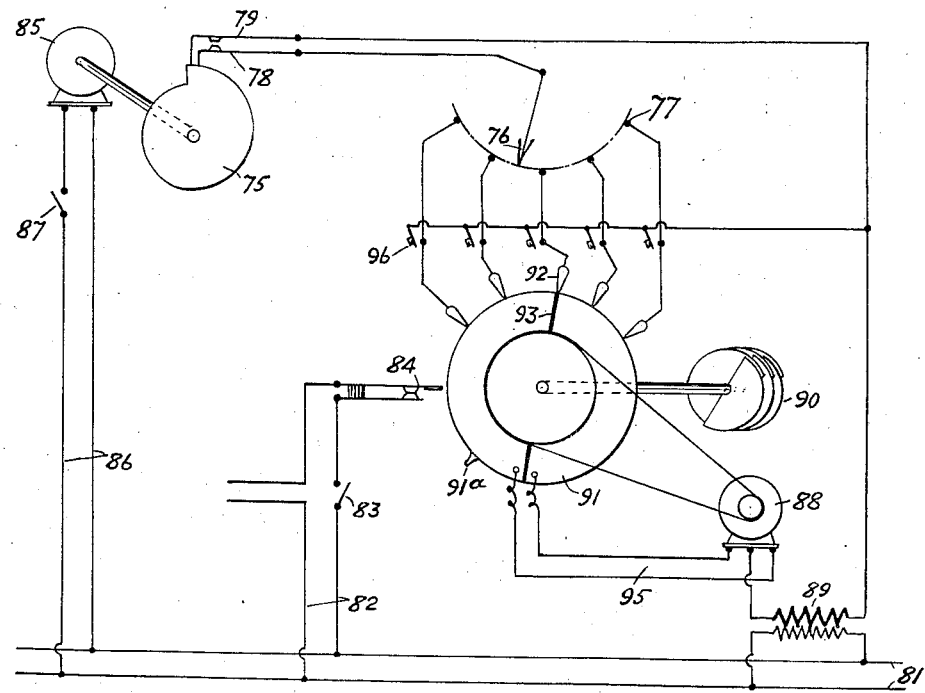
Figure 22 is a view illustrating diagrammatically a circuit for use in connection with a push button type of radio receiver having a motor driven condenser.

Referring to Figure 22 the wiring diagram there shown is useful in connection with the mechanism shown in Figs. 19 to 21 to operate a push button type of radio receiver having a motor driven connection. Power line 81, preferably of sixty cycles and 110 volts, supplies power to the radio main power circuit 82 having in series a manual "on" and "off" switch 83 and an automatic cut off switch 84. The line 81 also supplies power to the selector mechanism motor 85 through the circuit 86 containing an "on" and "off" switch 87 for synchronizing mechanism contact periods with radio station announcements. Line 81 also supplies power to condenser driving motor 88 through transformer 89 which transforms to approximately 20 volts. Motor 88 is a reversing motor which turns condenser 90 through disk 91 to a position indicated by one of the contact fingers 92 coming to rest on insulator 93 having previously contacted upon that half of disk 91 which causes insulator 93 to approach that contact 92 by operation of motor 88 in the direction indicated by the leads 95, power being supplied through completion of the circuit through push button 96 or automatic contacts 76 to 79 inclusive. One of the contact fingers 92 may be positioned to cause an insulated projection 91ª on the disk 91 to open contact 84 in the radio main power supply circuit which will reclose upon operation of any other contact finger 92. In this way automatic on and off operation of the radio receiver is effected. Further, automatic station changing can take place even with the switch 83 open so that on closing switch 83 the set is already tuned to the predetermined station desired for that time.

It will be obvious to those skilled in the art to which the invention relates that modifications may be made in details of construction and arrangement without departing from the spirit of the invention which is not limited in respect to such matters or otherwise than the appended claims may require.

I claim:

1. Automatic program control mechanism comprising a constant speed motor driven element which makes one complete revolution in each predetermined interval of time, a pin carrying disk turned a predetermined part of a revolution at like intervals, a reciprocating element provided with a plurality of projections having different dimensional characteristics, means for bringing into cooperation one of the pins in the disk and one of said projections at suitable intervals, and selector devices positioned by said reciprocating element in accordance with the length of its stroke which is governed in accordance with the setting and character of the pins in the disk.

2. Automatic program control mechanism comprising timing mechanism including a constant speed motor driven element which makes one complete revolution in each predetermined interval of time, for example one complete revolution in 15 minutes, and a revoluble element and a spring set or wound by the motor driven element and adapted when released to turn the revoluble element in respect to the motor driven element and a latch operated by the motor driven element and adapted to release the revoluble element at substantially like intervals, selector mechanism comprising a disk turned a predetermined part of a revolution at like intervals and constructed to receive endwise slidable pins of different lengths and a backstop and a spring pressed bar periodically released by the revoluble element and positioned by the first mentioned pins acting against the backstop, and controller positioning mechanism including a block element provided with stop pins of variable lengths and spring pressed mechanism tending to reciprocate it through a full stroke, the travel of the block being limited by the length of the stop pins through the intervention of the bar and backstop, and devices controlled by the travel of the block and adapted to position a controller.

3. Automatic program control mechanism comprising a bar, mechanism tending to move the bar one full stroke at each predetermined interval of time, a disk provided with holes arranged in annular rows corresponding to each day in the week and also arranged in radial rows corresponding to said time intervals for a period of one day, pins of different lengths and of which the insertion of one in a hole for endwise movement fixes both selection and time, a master pin alignable with any one of said pins and traversably mounted on the bar, mechanism for traversing the master pin on the bar with a step by step motion for each day in the week and for returning it, said master pin cooperating with one of said pins and with a fixed element to limit the movement of the bar, elements adapted to position a controller, a group of adjustable length stop pins each corresponding to a different length of the first mentioned pins and to a particular elevation of the bar and adapted to control the setting of the controller positioning elements, means including a spring and tending to shift the group of stop pins so that one or another of them collides with the bar to position the controller positioning elements, and devices for actuating said parts.

4. Automatic program control mechanism comprising a bar, motor driven spring and cam mechanism tending to raise and lower the bar, a master pin traversably mounted on the bar, a revoluble disk provided with holes, a set of pins of different lengths insertable into and endwise movable in the holes and alignable one at a time with the master pin, a back stop for said pins and for the master pin by which the travel of the bar is arrested, a group of adjustable stop pins of which only a predetermined one may collide with the bar when the bar is at an elevation determined by the backstop, the master pin and one of the pins in the first set, control elements adapted to position a controller and positioned by the stop pins, and mechanical means for actuating said parts, and for traversing the master pin.

5. Automatic program controlling mechanism comprising a bar, mechanism tending to raise and lower the bar, a master pin traversably mounted on the bar, a revoluble disk provided with holes, a set of pins of different lengths insertable into the holes and alignable one at a time with the master pin, a back stop for said pins and for the master pin by which the travel of the bar is arrested, a group of stop pins of different lengths and of which only one may collide with the bar when the latter is at a predetermined elevation, a controller element positioned by the stop pins and in respect to which said stop pins are individually adjustable to properly position the control element, and mechanical means for actuating said parts including means for traversing the master pin.

6. Automatic program controlling means comprising in combination, a controller, spring actuated mechanism tending, when released, to govern the controller and provided with a face having graduated projections, an abutment movable across the face into line with the individual graduations thereof and adapted to stop the spring actuated mechanism in different positions appropriate for the controller position selected, elements adapted respectively to position said abutment in accordance with their respective effective lengths, a carrier adapted to receive said elements in time relation, means for periodically moving said carrier, and a constant speed motor and its mechanical connections actuating said parts.

7. Automatic program controlling means comprising in combination, a controller, spring actuated mechanism tending, when released, to govern the controller and provided with a face graduated in respect to physical dimension, an abutment movable across the face into line with the individual graduations thereof and adapted to stop the spring actuated mechanism in different positions, determining elements adapted respectively to position said abutment in accordance with their respective dimensional characteristics, a carrier adapted to receive said elements in time relation, means for periodically moving said carrier, and a constant speed motor and its mechanical connections actuating said parts.

8. An automatic program controlling means comprising the combination of controller positioning elements, spring actuated cam reset mechanism acting when released to move the controller positioning elements, time controlled devices for resetting and releasing said mechanism at regular intervals of time, cooperating stop and selection elements relatively differing in respect to length of projection and of which the selector elements are arranged in one plane and the stop elements are arranged in another plane normal to the first plane and are supported by said mechanism, a time driven plate adapted to receive said selector elements in time relation, time controlled spring and cam actuated device interposed between the stop and selector elements and positioned by each of the selector elements as determined by its position in said plate and stopping the movement of said mechanism, when released, at predetermined points in its travel thereby selecting a predetermined controller position, and a constant speed motor and mechanical connections for actuating said parts.

9. An automatic program controlling means for a radio receiving set comprising the combination of elements adapted to position a station selecting device, spring actuated cam reset mechanism acting when released to move said elements, time controlled devices for resetting and releasing said mechanism at regular intervals of time, cooperating stop and selection elements relatively differing in respect to length of projection and of which the selector elements are arranged in one plane and the stop elements are arranged in another plane normal to the first plane and are carried by said mechanism, a time driven plate adapted to receive said selector elements in time relation, a time controlled spring actuated and cam reset device interposed between the stop and selector elements and positioned by the selector elements as determined by their positions in said plate and by their lengths and stopping the movement of said mechanism when released at predetermined points in its travel thereby selecting a position for the selection device, a time driven spiral cam, means including a cam and spring pressed follower for driving the spiral cam at daily intervals, connections between the spiral cam and said device whereby the latter is shifted in respect to the projections of the selecting elements, and a constant speed motor and connections for actuating said parts.

10. An automatic program controlling means for a radio receiving set comprising elements adapted to position a station selecting means, a slidable block having face projections differing in respect to length in correspondence with the stations, means for periodically advancing said block with a yielding motion and for returning it with a positive motion, mechanism for stopping the advance motion of said block, including pins, a periodically shifted pin carrier mechanism in respect to which the pins respectively project to different extents and in which the pins are arranged in time relation, said pins by the lengths to which they respectively project serving to stop said block in positions corresponding to the selected stations, a constant speed motor and connections for actuating said parts.

11. An automatic program controlling means for a radio receiving set comprising elements adapted to position a station selecting means, a block having provisions for positioning said elements, mechanism for periodically advancing the block and for returning it, a periodically moving pin carrier having pins arranged in time intervals of a day and of the days of the week, periodically moved mechanism corresponding to the days of the week and cooperating with said pins to bring groups of them into operation on different days, said pins operating selectively to check the movement of said block, and a constant speed motor and mechanical connections for operating said parts.

12. In combination a spring advanced element having a face of irregular conformation, a spring elevated abutment cooperating selectively with the various irregularities of the face to arrest said element at predetermined position, a series of pins movable into and out of the path of motion of the abutment and having respectively different dimensional characteristics to position the abutment, a carrier for said pins, and means for actuating said parts.

13. In combination a control device, means for positioning the control device to predetermined positions at predetermined times including a series of pins and a pin carrier, means tending to move the pins in one direction the dimensional character of the pins determining the operation of said means, transparent material cooperating as a back stop with said pins and through which they and their position in the carrier are visible, and means for actuating said parts.

14. In an automatic time controlled selecting mechanism a controller, means tending to move the controller, a series of removable selection determining elements of different dimensional characteristics respectively serving when present to position the controller, a stop element connected with the controller and means adapted to engage said stop element in the absence of a selection determining element.

15. In combination a spring advanced element having a face of irregular conformation, controller elements positioned by said element, a spring elevated abutment cooperating selectively with the various irregularities of the face to arrest said element at predetermined positions, a periodically moved carrier, a series of pins insertable into the carrier and supported and moved by said carrier and having respectively different dimensional characteristics and adapted to position the abutment in position determined by the dimensional characteristics of the pins at times determined by position of the pins in the carrier, and means for actuating said parts.

16. In combination a carrier element having a surface provided with receptacles arranged in a programmed manner, a plurality of stop pins insertable into the carrier and classified in respect to projection from the carrier surface, a master pin adapted to engage any of said stop pins, a stop bar cooperating with the master pin and positioned by the projection of a stop pin through the intervention of the master pin, a controlled element, a plurality of positioning pins carried by the controlled element and adjustable with respect to projection from a surface thereof and selectively engageable with the stop bar to position the controlled element as determined by the selection of the stop pin and the adjustment of the corresponding positioning pin, and a constant speed motor for actuating said parts and timing said events.

17. A time controlled selecting means including a plurality of color-coded selection determining elements, the dimensional characteristics of which determine the selection and correspond to said colors, a carrier for said selection determining elements, means tending to move the elements in one direction, a transparent material cooperating as a backstop with said elements and through which they and their position in the carrier are visible and means for actuating said parts.

JOHN S. BALLARD.